Figure 1:
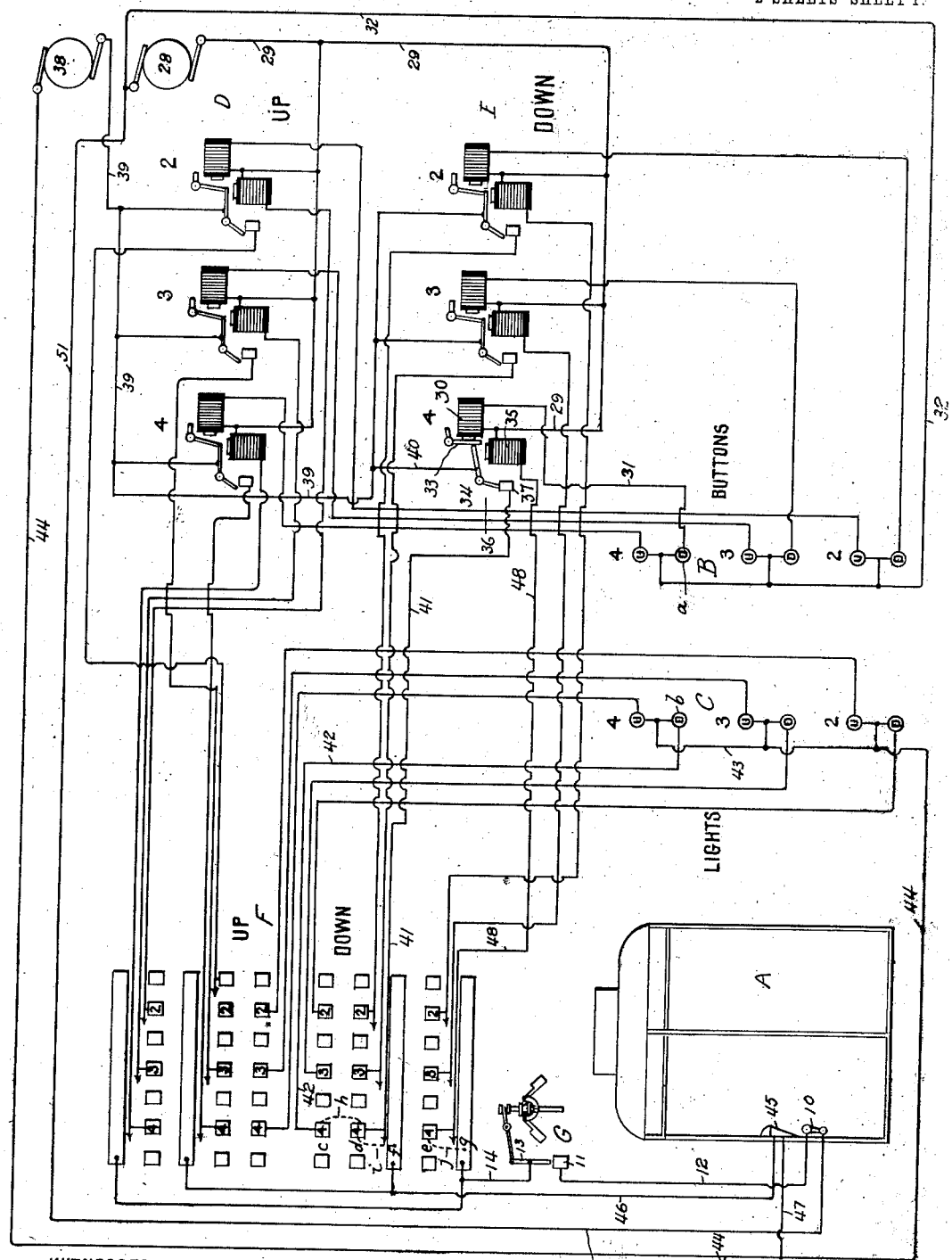

T. PORTER.
ELEVATOR SIGNALING APPARATUS.
APPLICATION FILED APR. 17, 1913.

1,075,270.

Patented Oct. 7, 1913.

2 SHEETS—SHEET 1.

WITNESSES
William P. Goebel
C. Bradway

INVENTOR
Thomas Porter
BY Munn & Co
ATTORNEYS

T. PORTER.
ELEVATOR SIGNALING APPARATUS.
APPLICATION FILED APR. 17, 1913.
1,075,270.
Patented Oct. 7, 1913
2 SHEETS—SHEET 2.
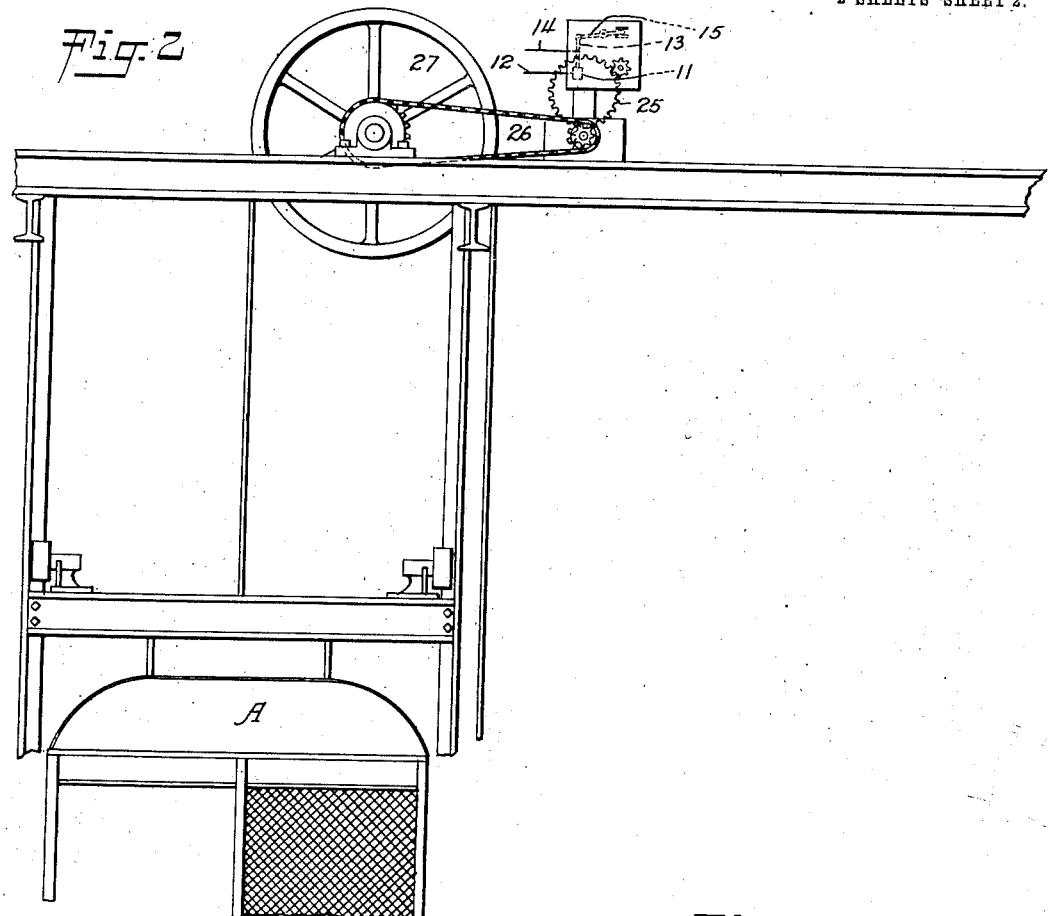
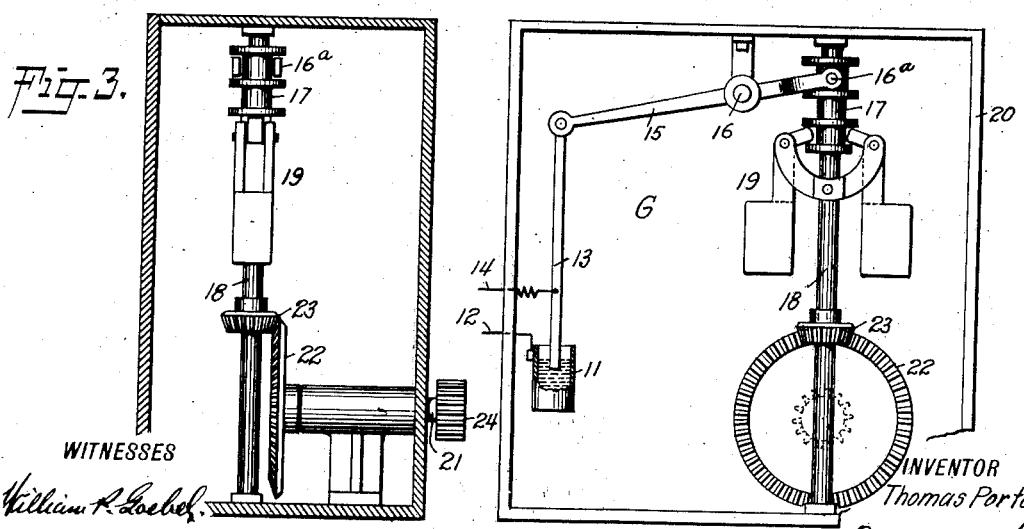
WITNESSES
INVENTOR
Thomas Porter
BY
ATTORNEYS

UNITED STATES PATENT OFFICE.

THOMAS PORTER, OF NEW YORK, N. Y., ASSIGNOR OF ONE-HALF TO ROBERT W. BEARDSLEE, OF NEW YORK, N. Y.

ELEVATOR SIGNALING APPARATUS.

1,075,270.  Specification of Letters Patent.  Patented Oct. 7, 1913.

Application filed April 17, 1913. Serial No. 761,728.

*To all whom it may concern:*

Be it known that I, THOMAS PORTER, a subject of the King of Great Britain, and a resident of the city of New York, borough of Brooklyn, in the county of Kings and State of New York, have invented a new and Improved Elevator Signaling Apparatus, of which the following is a full, clear, and exact description.

All modern elevator systems are provided with means at each floor by which a passenger can indicate to the operators of the various cars the fact that he desires a car to stop. The usual form of signaling device is some type of electric push button which either indicates to the operator the direction the passenger desires to travel or indicates only to those operators traveling in the desired direction. In addition to the signal to the operator there is frequently an additional signal at the floor indicating which car is to make the stop.

In most of these systems the signals are set back to their original position automatically by the car passing the floor in the desired direction and this is done regardless of whether or not the car makes the stop for the passenger. Some systems provide a button, called the transfer button, whereby the operator can prevent his car from setting back the signal in case he does not intend making the stop. In this manner the following car gets the signal and makes the stop. This method is defective, however, as many times the signal is received by the operator when he is so near the floor from which the signal is given that he does not have time to make the stop or to even push the transfer button, and as a consequence the signal is set back, and succeeding cars, receiving no signal, do not stop. The passenger, not being familiar with the details of the signaling system, sees several cars pass before realizing the necessity of again pushing the button. Where the service is heavy and rapid this condition frequently occurs with the result that the elevator service is severely criticized for a condition which can not be prevented with the existing system.

It is the object of the present invention to overcome the difficulties above mentioned by improving signaling systems of the character referred to by providing an automatically-controlled switch for each car, which operates to close the signal resetting circuit only when a car stops at the floor where the signal is given, and, consequently, if a car passes, intentionally or otherwise, the floor where the signal is given, the signal will remain to notify the operators of succeeding cars. The ordinary transfer push button that is intended to be operated by the car operator or conductor is dispensed with and the resetting circuits are controlled automatically by the cars themselves.

A specific object of the invention is the provision of an automatic switch in the circuit of each reset magnet for all the push button and signal circuits of each shaft, the switch being preferably, although not necessarily, a speed responsive device operatively connected with some moving part of the car hoisting mechanism, so that, when the car is stopped, the speed responsive device will close the resetting circuit for the particular signal magnet that has been energized by the pushing of the signal button where the passenger desires to board the car.

With these objects in view, and others as will appear as the description proceeds, the invention comprises various novel features of construction and arrangement of parts which will be more fully described hereinafter and set forth with particularity in the claims appended hereto.

In the accompanying drawings, which illustrate one embodiment of the invention, and wherein similar reference characters are employed to designate corresponding parts throughout the several views, Figure 1 is a diagrammatic view of the signaling system with my automatic transfer switch installed therein; Fig. 2 is a view of the hoisting mechanism for the car, with the automatic transfer switch applied thereto; Fig. 3 is a speed responsive device for operating the transfer switch; and Fig. 4 is a side view showing the switch and speed responsive device.

The present invention is shown in connection with a signaling system of that type disclosed in United States patent to Smalley & Reiners, Number 643,220, but it is to be understood that the invention can be used in any other system wherein the passing of a car by a floor where a passenger gives a stopping signal cuts out the signals of all the other shafts of the elevator system.

In order to obtain a comprehension of the invention as applied to an elevator signaling system, such system will be briefly described in connection with Fig. 1, wherein A designates one of a plurality of elevator cars to which an up or down stop signal can be given from any floor by the buttons B, up and down buttons for floors 2, 3 and 4 being shown, and for the same floors are the signal lights C. In the circuits of the up push buttons and lights are the signal and reset magnets D, and in the circuits of the down push buttons and lights are the signal and reset magnets E. The usual commutator mechanism F is employed at the top of each elevator shaft for controlling the floor lights, car lights and reset magnets, after the method of operation disclosed in the patent hereinbefore referred to. In the car A is the usual transfer switch or button 10. The same need not be employed as long as the automatic transfer switch G is operative. In fact, the transfer button 10 can be eliminated if desired, as the automatic transfer switch G will take care of the conditions of service that brought about the introduction of the transfer button in elevator cars.

The automatic transfer switch may be of any desired construction and operated in any suitable manner, the purpose of the switch being to automatically open the circuit of the resetting magnets and keep the circuit open as long as the elevator cars are in motion, but as soon as any car stops at a floor the switch will close the circuit of the resetting magnet for the signal magnet of that particular floor. A simple and effective automatic transfer switch is shown in Figs. 3 and 4. The switch consists of a mercury cup 11 which is connected in circuit by the wire 12, and with which is adapted to coöperate a movable contact 13 connected in circuit by the wire 14, the said movable contact being connected with a lever 15 fulcrumed at 16, that is connected at 16ª with a sleeve 17 slidably mounted on the governor shaft 18. On the shaft 18 is a speed responsive device or governor 19, which causes the sleeve 17 to move up and down according to the speed of the car, it being understood that the shaft 18 rotates as long as the car is moving, and has a speed variable with that of the car. The switch G is preferably mounted within a protecting casing 20, which is located at the top of the elevator shaft, and is driven by some part that moves with the hoisting mechanism of the car. In the bottom of the casing 20 is a shaft 21 which has a miter gear 22 meshing with a miter gear 23 on the governor shaft 18, the shaft 21 having on its outer end a pinion 24 which meshes with a gear wheel 25 driven by a sprocket and chain mechanism 26 from the hoisting drum 27, Fig. 2. As the car travels, the centrifugal elements of the speed responsive device 19 fly outwardly and raise the movable contact 13 out of the mercury cup 11, as shown in Fig. 1, thereby opening the circuit of the resetting magnets. When the car slackens its speed to, say, one quarter normal speed, more or less, or when the car stops, the circuit will be closed by the speed responsive device permitting the movable contact 13 to lower into the mercury cup. When the car is stopped to take on a passenger the circuit of the resetting magnet will be closed to reset or open the signal switch that was closed when the passenger pressed the car signal button.

The various circuits will be traced out to show the operation of the system when a passenger presses one of the signal buttons, for instance, the down button $a$ at the floor 4. Current now flows from the low voltage push button circuit generator 28 through the wire 29, signal magnet 30, wire 31, push button $a$, return wire 32 and generator 28. The signal magnet 30 of the down set for the floor 4 is energized, attracting its armature or detent 33, so as to release such detent from the armature 34 of the reset magnet 35, whereby movable contact 36 connected with the armature 34 will drop into the mercury cup or fixed contact 37 of the floor light circuit. As soon as a descending car reaches a distance about two floors above the floor where the signal push button has been pressed by a passenger desiring to take the next down car, the commutator mechanism F will close the circuit for the down floor lamp $b$. It will be understood that the commutator mechanism F is provided with a screw-actuated carriage which moves synchronously with the elevator car, said carriage carrying a series of bridging contacts which coöperate with the rows of contacts $c$, $d$ and $e$, and contact bars $f$ and $g$. When the fixed contacts of the $c$ and $d$ rows in the circuit of the down lamp $b$ are bridged by the traveling bridging contact $h$, the circuit will be completed so that current will flow from the high voltage generator 38 through the wire 39, branch 40, mercury cup switch 36, 37, wire 41, contact $d$, bridging contact $h$, contact $c$, wire 42, down lamp $b$, wire 43, common return wire 44 and generator 38. As there are several bridging contacts $h$, the lamp $b$ at the fourth floor will be kept lighted for a suitable interval before the car reaches such floor. A little after the floor lamp $b$ is lighted, a bridging contact $i$ will close the circuit of the operator's signal lamp 45 in the car A, and current will pass from the generator 38 through the wires 39 and 40, mercury pot switch 36 and 37, wire 41, contact $d$, bridging contact $i$, contact bar $f$, wire 46, operator's signal light 45, wires 47 and 44 and generator 38. The operator is thus warned that a passenger is waiting on floor 4 for his car to stop to take aboard such passenger, as it will be understood that the operator's signal lamp 45 will light up only when the car is about a story from that floor where the stop is desired. As soon as the car stops, the automatic switch G will move to closed circuit position, so that, as soon as the car starts again on its course, the circuit of the resetting magnet 35 will be closed, this being done by a bridging contact $j$ of the commutator mechanism F coming into engagement with the contacts which are in circuit with the resetting magnet 35. When the resetting circuit is closed current flows from the generator 28 through the wire 29, electro-magnet 35, wire 48, the segment of the row of contacts $e$ connected with such wire, bridging contact $j$, contact bar $g$, wire 14, contacts 13 and 11 of the automatic transfer switch G, wire 12, transfer push button 10 in the car, wire 51 and generator 28. As a result of the energizing of the resetting electro-magnet 35 the armature 33 for the mercury pot switch for the signal circuit of the lamp B will be moved to open circuit position, the armature 33 automatically engaging over the armature 34 to hold the said switch open. Should the car pass by the floor from which the signal was given, either intentionally or otherwise, the automatic transfer switch G keeps the circuit of the resetting magnets open, so that the signal or signals remain for the succeeding car or cars. Consequently the passenger does not have to operate the signal push button more than once, as the signal remains until a car stops at the floor where such signal is given.

From the foregoing description taken in connection with the accompanying drawings, the advantages of the method of operation and of the apparatus shown will be readily understood by those skilled in the art to which the invention appertains, and while I have described the best embodiment thereof, I desire to have it understood that the apparatus shown is merely illustrative, and that such changes may be made when desired as are within the scope of the appended claims.

Having thus described my invention, I claim as new and desire to secure by Letters Patent:

1. In an elevator signaling system, the combination of a push button circuit, a car signal circuit controlled thereby, a resetting circuit for opening the signal circuit, and an automatically-actuated device maintaining the resetting circuit open while the car is in motion, and adapted to close the resetting circuit when the car stops at a floor from which the signal circuit was controlled.

2. In an elevator signaling system, the combination of a push button circuit, a signal circuit controlled by the push button circuit, a resetting circuit for opening the signal circuit when a car has stopped to answer the signal, and an automatic transfer switch controlling said resetting circuit by the motion of the car, said switch being open while the car is in motion, and including means whereby the switch closes when the car stops.

3. In an elevator signaling system, the combination of a push button circuit, a signal circuit controlled by the push button circuit, a resetting circuit for opening the signal circuit when a car has stopped to answer the signal, an automatic transfer switch controlling said resetting circuit by the motion of the car, said switch comprising relatively movable contacts, and a speed responsive device for holding the contacts separated when the car is in motion, and for engaging the contacts when the car stops.

4. In an elevator signal system, the combination of a car, a hoisting mechanism therefor, and an automatic transfer switch controlled by the speed of the hoisting mechanism, with a push button circuit, a signal circuit controlled thereby, and a resetting circuit held open by the said transfer switch while the car is in motion, and adapted to close when the car stops, whereby the signal circuit is opened or reset.

In testimony whereof I have signed my name to this specification in the presence of two subscribing witnesses.

THOMAS PORTER.

Witnesses:
 C. BRADWAY,
 PHILIP D. ROLLHAUS.